US008484560B2

(12) United States Patent
Vuong et al.

(10) Patent No.: US 8,484,560 B2
(45) Date of Patent: Jul. 9, 2013

(54) INTERACTIVE SUB-SUMMARIES IN DATABASE APPLICATIONS

(75) Inventors: Duc Vuong, Ottawa (CA); Ashok Srinivasan, Ottawa (CA); Christopher Crim, Santa Clara, CA (US); Toufic Milan, Ottawa (CA); Stephen Iremonger, Santa Clara, CA (US); Andrew Paulsen, San Jose, CA (US); Rick Kalman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 12/430,001

(22) Filed: Apr. 24, 2009

(65) Prior Publication Data

US 2010/0275149 A1      Oct. 28, 2010

(51) Int. Cl.
*G06F 17/00* (2006.01)

(52) U.S. Cl.
USPC .......................................... 715/253; 715/254

(58) Field of Classification Search
None
See application file for complete search history.

(56) References Cited

U.S. PATENT DOCUMENTS

| | | | | | |
|---|---|---|---|---|---|
| 5,832,532 | A * | 11/1998 | Kennedy et al. | ............... | 715/215 |
| 5,874,953 | A * | 2/1999 | Webster et al. | ................ | 715/733 |
| 5,937,155 | A * | 8/1999 | Kennedy et al. | .............. | 714/38.1 |
| 6,613,099 | B2 * | 9/2003 | Crim | .............................. | 715/210 |
| 6,626,959 | B1 * | 9/2003 | Moise et al. | ................... | 715/216 |
| 7,000,182 | B1 * | 2/2006 | Iremonger et al. | ............ | 715/235 |
| 7,676,744 | B2 * | 3/2010 | Hanechak | ....................... | 715/243 |
| 7,890,927 | B2 * | 2/2011 | Eldridge et al. | ............... | 717/110 |
| 2002/0069204 | A1 * | 6/2002 | Kahn et al. | ....................... | 707/10 |
| 2002/0152189 | A1 * | 10/2002 | Crim | ................................ | 707/1 |
| 2003/0028560 | A1 * | 2/2003 | Kudrolli et al. | ............... | 707/509 |
| 2003/0043195 | A1 * | 3/2003 | Kling et al. | .................... | 345/766 |
| 2004/0088650 | A1 * | 5/2004 | Killen et al. | ................... | 715/503 |
| 2006/0004745 | A1 * | 1/2006 | Kuhn et al. | ........................ | 707/4 |
| 2006/0026122 | A1 * | 2/2006 | Hurwood et al. | .................. | 707/1 |
| 2006/0048048 | A1 * | 3/2006 | Welcker et al. | ............... | 715/513 |
| 2006/0061687 | A1 * | 3/2006 | Dunton | .......................... | 348/564 |
| 2006/0129926 | A1 * | 6/2006 | Malek et al. | ................... | 715/530 |
| 2006/0129977 | A1 * | 6/2006 | Segar et al. | .................... | 717/110 |
| 2007/0044014 | A1 * | 2/2007 | Hanechak | ....................... | 715/517 |
| 2007/0067711 | A1 * | 3/2007 | Woodall et al. | ............... | 715/505 |
| 2008/0010605 | A1 * | 1/2008 | Frank | ............................. | 715/765 |
| 2008/0033876 | A1 * | 2/2008 | Goldman et al. | ............... | 705/42 |
| 2008/0320050 | A1 * | 12/2008 | Chan | ............................. | 707/200 |
| 2009/0083614 | A1 * | 3/2009 | Wedekind | ..................... | 715/217 |

OTHER PUBLICATIONS

From information visualization to direct manipulation: Extending a generic visualization framework for the interactive, editing of large datasets, Baudel et al, UIST, Oct. 15-18, 2006.*

* cited by examiner

*Primary Examiner* — Kuen S Lu
*Assistant Examiner* — Augustine K Obisesan
(74) *Attorney, Agent, or Firm* — Fish & Richardson P.C.

(57) ABSTRACT

A system displays content from a database in a formatted view. The formatted view includes one or more data fields arranged in one or more data sections. Each of the data sections includes a sub-summary display field. The system receives a request to modify data in one of the data fields. In response, the system reformats the formatted view. The reformatting includes moving the data field from a first data section to a second data section and updating the sub-summary display field in the first data section and the sub-summary display field in the second data section. The system displays the reformatted view.

18 Claims, 8 Drawing Sheets

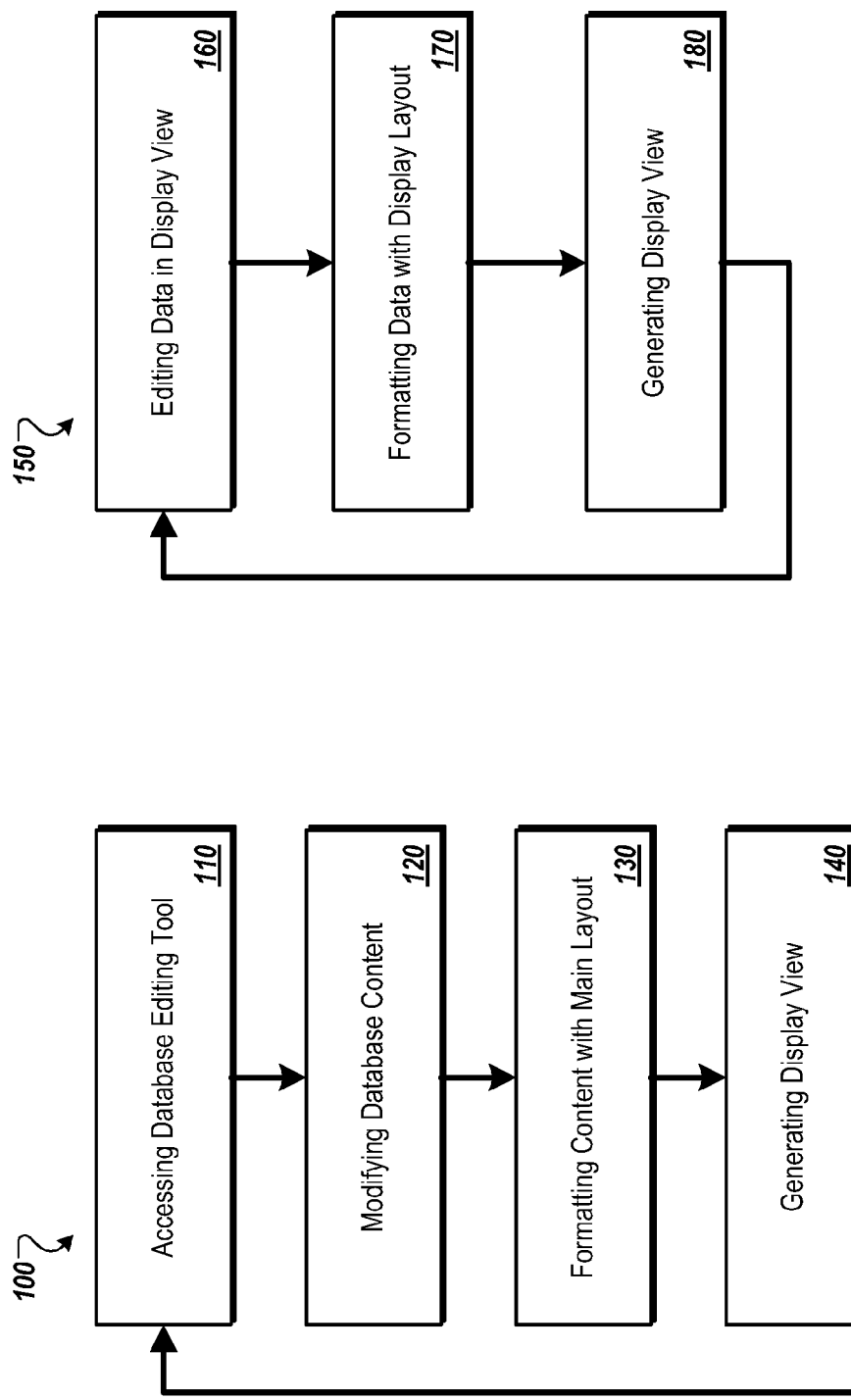

| Region | Sales Rep | Sales |
|---|---|---|
| A | Adam | 100 |
| A | Betty | 200 |
| A | Carl | 300 |
| | Total: | 600 |
| B | David | 200 |
| B | Ed | 150 |
| | Total: | 350 |
| C | Frank | 120 |
| C | Gary | 110 |
| | Total: | 230 |

FIG. 2A

| Region | Sales Rep | Sales |
|---|---|---|
| A | Adam | 100 |
| A | Betty | 200 |
| | Total: | 300 |
| B | Carl | 300 |
| B | David | 200 |
| B | Ed | 150 |
| | Total: | 650 |
| C | Frank | 120 |
| C | Gary | 110 |
| | Total: | 230 |

FIG. 2B

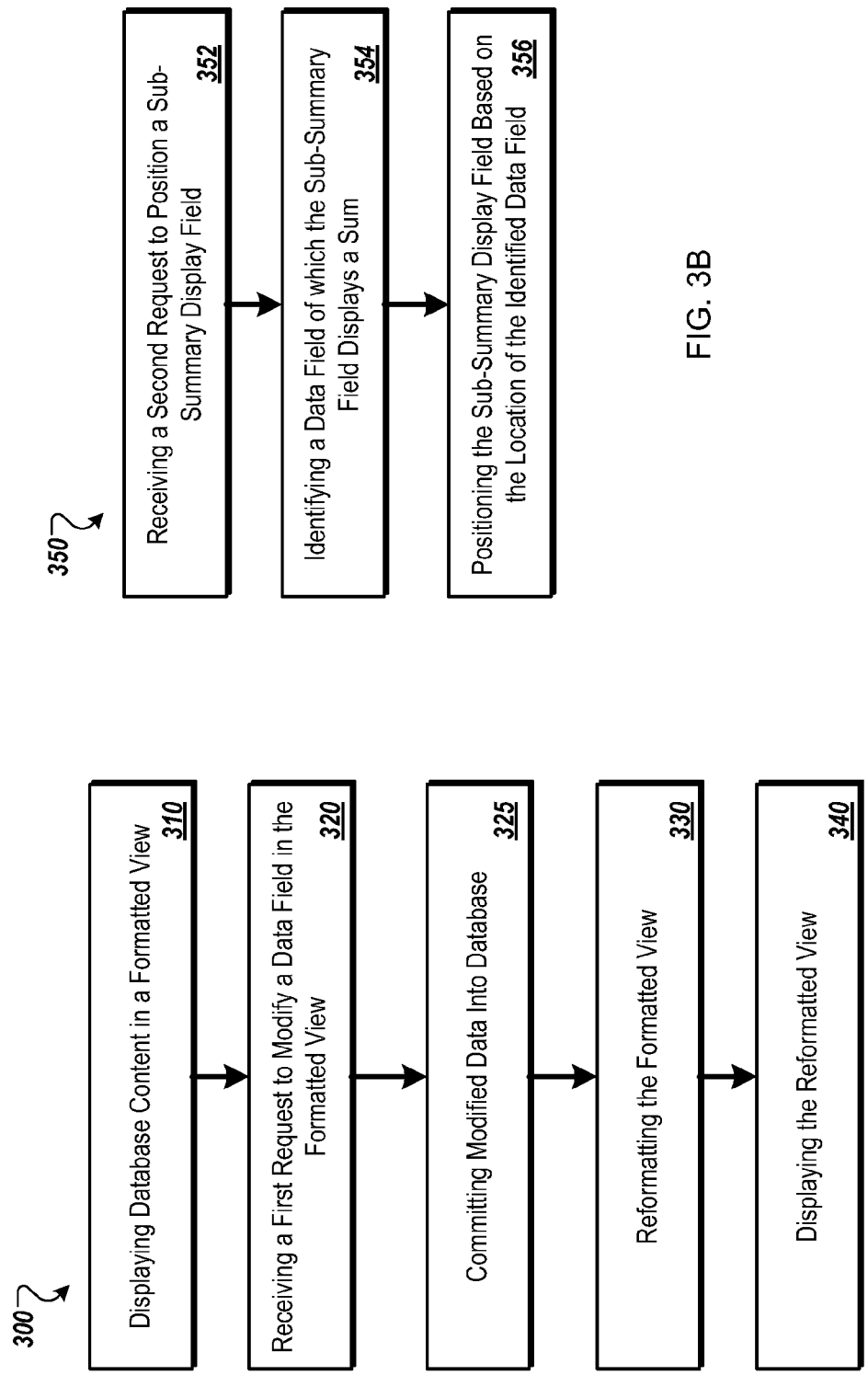

INTERACTIVE SUB-SUMMARIES IN DATABASE APPLICATIONS

TECHNICAL FIELD

This disclosure relates generally to database applications.

BACKGROUND

Many modern database tools integrate a database engine with a graphical user interface (GUI). In the GUI, the content of the database is formatted and displayed according to a layout. To modify the displayed content in conventional database tools, a user either updates the content in the database using a database editing tool or updates the layout using a layout editor. The content is formatted again using the updated data and updated layout. When multiple users use the same layout, one user's update in the layout is propagated to all users. Therefore, the conventional database tools are not suitable when a user intends to experiment with various layouts without affecting other users.

SUMMARY

In some implementations, a system displays database content formatted using a cached layout. Unlike conventional database tools, a user can modify data and a display layout directly on the display without using components such as a database editor or a layout editor. The modifications of the data and the layout can be stored locally. Therefore, a user can make layout changes without propagating the changes to other users. The changes can be reflected immediately on the display, without the user having to run another database query or perform a complete reformat the data. The system can create, update, and delete sub-summary data fields interactively in response to the user's changes.

In some implementations, a system displays content from a database in a formatted view. The formatted view includes one or more data fields arranged in one or more data sections. Each of the data sections includes a sub-summary display field. The system receives a request to modify data in one of the data fields. In response, the system reformats a displayed portion of the formatted view. The reformatting includes moving the data field from a first data section to a second data section and updating the sub-summary display field in the first data section and the sub-summary display field in the second data section. The system displays the reformatted view.

In some implementations, a system displays database content in a formatted view. The formatted view is formatted based on a main layout. The formatted view includes one or more data fields. Upon receiving a request to add a new data field, the system updates a cached layout associated with the formatted view based on the request. Updating the cached layout includes creating a new layout node in the cached layout to represent the new data field; identifying layout nodes that are relevant to the new data field from the main layout; and copying the identified layout nodes from the main layout to the cached layout. The system reformats the formatted view according to the cached layout.

The details of one or more implementations of interactive sub-summaries are set forth in the accompanying drawings and the description below. Other features, aspects, and advantages of interactive sub-summaries will become apparent from the description, the drawings, and the claims.

BRIEF DESCRIPTION OF THE DRAWINGS

FIGS. 1A and 1B are flowcharts illustrating an exemplary process for modifying data in a conventional database reporting tool and an exemplary process using interactive sub-summary techniques, respectively.

FIGS. 2A and 2B illustrate an exemplary implementation of interactive sub-summary techniques.

FIGS. 3A and 3B are flowcharts illustrating exemplary processes for displaying database content using interactive sub-summary techniques.

Like reference symbols in the various drawings indicate like elements.

DETAILED DESCRIPTION

Interactive Sub-Summary Overview

Figures 4A, 4B:
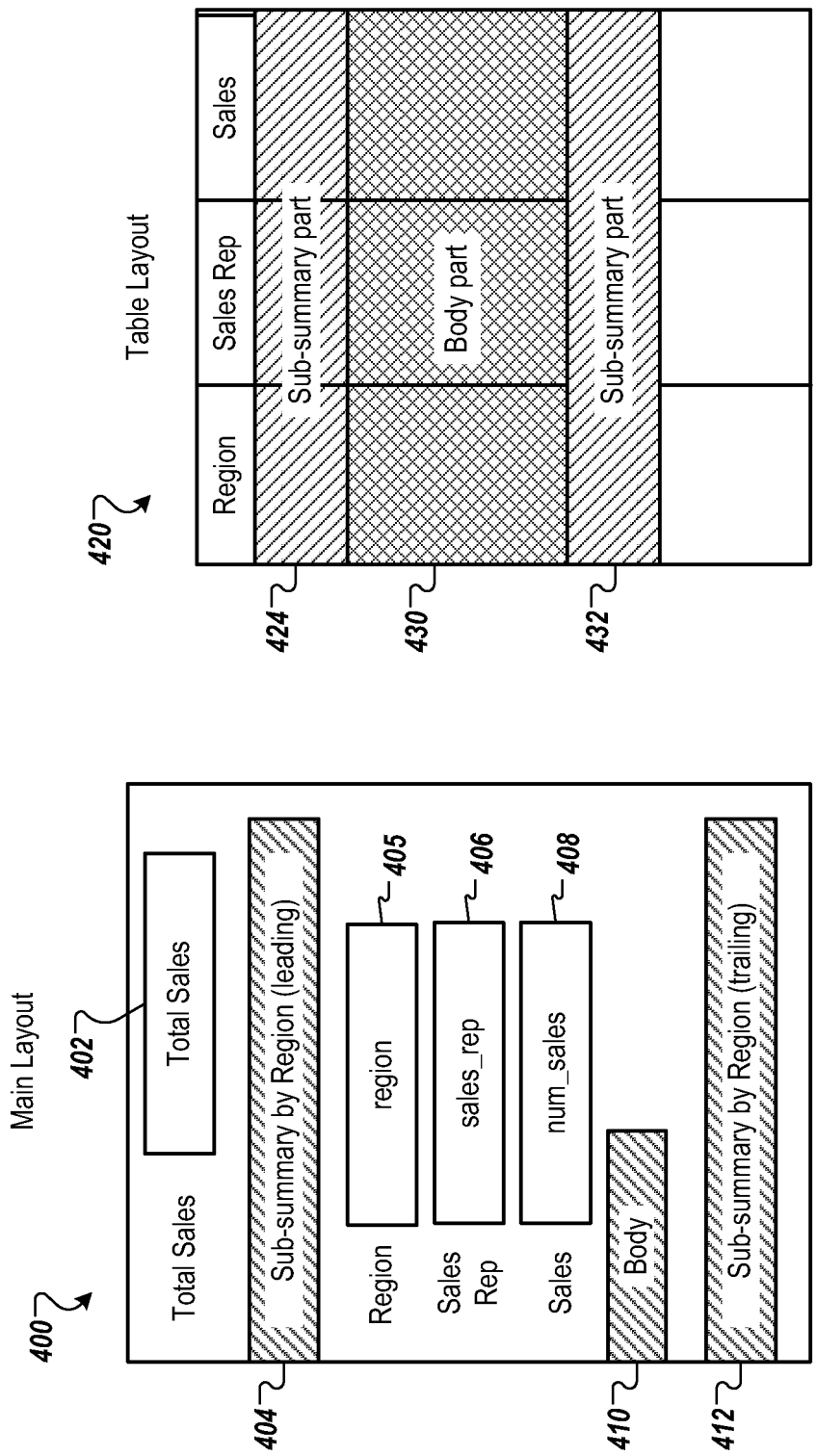
FIGS. 4A and 4B illustrate exemplary layouts for formatting display views as used in interactive sub-summaries.

FIGS. 1A and 1B are flowcharts illustrating an exemplary process for modifying data in a conventional database reporting tool and an exemplary process using interactive sub-summary techniques. For convenience, the exemplary process will be described with respect to a system that performs the techniques, and a user using a database application program.

FIG. 1A is a flowchart illustrating an exemplary process 100 for modifying data in a conventional database reporting tool. Modern database applications permit a user to view formatted data through reporting tools instead of directly accessing raw data stored in the database. In a conventional database application program, a software component for generating formatted display (e.g., a database reporting tool) is separate from a software component for modifying data (e.g., a database editing tool). The separation of the reporting tool and forms tool is logical because a user of the database reporting tool (e.g., an analyst or a manager) can be different from a user of the database editing tool (e.g., a customer service representative). Various users can have various access privileges (e.g., an analyst or a manager is not permitted to modify data, but a customer service representative can). Therefore, the reporting tool can be incapable of changing data, and the editing too can be incapable of viewing formatted displays.

However, the user sometimes needs to modify the data that the user is viewing, e.g., to correct a particular number while viewing the formatted data in a display view in a database reporting tool. In a conventional database application program, the user is required to access 110 the database editing tool, which can be an application program that is different from the application program that the user is viewing. The conventional database application needs to authenticate the user and determine that the user has sufficient privilege to edit the database. If the user does not have sufficient privilege to access the database editing functions, the user cannot continue. After the conventional database application authenticates the user and determines that the user has sufficient privilege to edit the database, the user can modify 120 database content in the database editing tool. After modifying the database content, the user returns to the database reporting tool, re-runs the user's database queries to retrieve the updated content, and uses the database reporting tool to format 130 the updated content. The conventional database reporting tool includes a main layout for the database application the user is running. The user can further edit the main layout to change the way the database content is displayed. The updated content is formatted according to the edited main layout. As a result, the conventional database application generates 140 a new display view. The user can repeat the process to further edit the database content or edit the main layout. In the conventional process 100, the user's data editing is committed to the database. The user's modification of the main layout changes the main layout. The changes made by the user are therefore propagated to other database applications and other users that access the same content or use the same layout.

FIG. 1B is a flowchart illustrating an exemplary process 150 for modifying data using interactive sub-summary techniques. The user needs to modify the data that the user is viewing in a database reporting tool without leaving the reporting tool and accessing a database editing tool. For example, the user needs to correct a particular number, while viewing the formatted data in a display view in the database reporting tool. Instead of accessing a separate database editing program, the user edits 160 the data directly in a database report displayed in the reporting tool. The edited data are pushed back into the database. The database reporting tool formats 170 the edited data using a display layout. A displayed portion of the database report is formatted to reflect changes associated with the edited data (e.g., a record is added to or removed from the displayed portion). The display layout can be selected and copied from a main layout. The user can further edit the display layout to change the way the edited data are displayed. The system generates a new display view on the edited data.

Example Process for Modifying Data in a Data Field

FIGS. 2A and 2B illustrate an exemplary implementation of interactive sub-summary techniques. FIG. 2A illustrates an example table view 200 of an example database application program in which data can be edited using interactive sub-summary techniques. Table view 200 is a display view in a database application program. The table view 210 has columns "Region," "Sales Rep," and "Sales." In those columns, the table view 200 displays a number of sales ("Sales") for each sales representative ("Sales Rep"), grouped by region. The example table view 200 displays data retrieved from the following example database table "sales":

TABLE 1 sales

| FIELD | TYPE | KEY |
|---|---|---|
| row_id | INT NOT NULL AUTO_INCREMENT | YES |
| region | VARCHAR(100) | |
| sales_rep | VARCHAR(100) | |
| num_sales | INT(11) | |

In example table view 200, a sub-summary is displayed for each region. A sub-summary can be a summary field that summarizes a particular data column based on a particular grouping. For example, sub-summary field 204, which shows a value "600," is a sub-summary representing a summation on the column "num_sales" and based on a grouping by region "A." Similarly, sub-summary field 206 summarizes total sales for region "B." In various implementations, the sub-summary field can be created by a database statement. For example, a Structured Query Language ("SQL") statement "SELECT SUM(num_sales) FROM sales GROUP BY region;" can be used. The sub-summary field can also be created by parsing the database result set returned from the database in response to a query or parsing cached database result sets. In some implementations, a sub-summary field can also be a field that represents an average, a median, a minimum, a maximum, or other calculations on the data column.

A user can edit a field 202 directly in the database reporting tool. For example, sales representative "Carl" is in region group "A." The user can change the region of "Carl" from region "A" to region "B." In some implementations, the changes are stored in a data cache area. The saved changes can be committed to the database upon a user request (e.g., by pressing a button that invokes a "commit" of the data). In some implementations, the changes are immediately committed to the database without further user interference. If committing the changes to the database is unsuccessful (e.g., when the data field is a result of a calculation that cannot be modified, when database field is protected, or when the user does not have privilege to update the database), an error message can be displayed.

FIG. 2B illustrates an example table view 210 of the example database application program in which data have been edited using interactive sub-summary techniques. Similar to the table view 200 in FIG. 2A, the table view 210 includes columns "Region," "Sales Rep," and "Sales." However, because sales representative "Carl" is now in region "B" according to the cached data, the record 212 of "Carl" is moved from region group "A" into region group "B." The move can be accomplished by applying the layout to the cached data. Also, the sub-summary fields 214 for region group "A" and 216 for region group "B" have been updated to reflect the fact that the sales number for "Carl" now counts for region group "B" rather than region group "A."

The example display views 200 and 210 in FIGS. 2A and 2B are table views. In a table view, the data from the database are displayed in tabular format, e.g., with rows and columns. In various implementations, a displayed view can be a list view, a browser view, or other forms of view. A list view can differ from a table view in that, for example, the data need not be organized in a tabular format, and the regions "A," "B," and "C" need not be repeated for each sales representative. In some implementations, where object-oriented technologies are employed, a table view class can be a subclass of a list view class.

FIGS. 3A and 3B are flowcharts illustrating exemplary processes 300 and 350 for displaying database content using interactive sub-summary techniques. For convenience, the exemplary processes 300 and 350 will be described with respect to a system that performs operations in the processes 300 and 350.

FIG. 3A is a flowchart illustrating an exemplary process 300 for displaying database content using interactive sub-summary techniques. In step 300, the system displays content from a database in a formatted view. The formatted view can be a table view, a list view, or another form of view that contains one or more data fields arranged in data columns in one or more data sections (e.g., groups). Each of the data sections can have one or more sub-summary display fields. Each of the sub-summary display fields can display a summary of a particular data column (e.g., amount of sales, number of sales) that is grouped by a group field (e.g., region). In some implementations, the group field can be a field that is used in the "GROUP BY" clause of a SQL statement. The group field can also be a field on which the database content is sorted.

In some implementations, more than one data columns can be used as multi-level group fields, separately or in combination. For example, a database table can include country data (e.g., "US," "Canada," etc.), state data (e.g., "California," "British Columbia," etc.), in addition to the region data (e.g., "A," "B," etc.). Sub-summaries can be calculated at each level of grouping. For example, a first level sub-summary can be calculated for each region, a second level sub-summary can be calculated for each state, and a third level sub-summary can be calculated for each country.

In some implementations, the more than one group fields can be used in conjunction as a single level group field. For example, a database table can contain data on sales representatives, regions of the sales representatives, and managers of the sales representatives. The data columns "region" and "manager" can be combined to form a single group field (e.g., by a SQL clause "GROUP BY region, manager"). A sub-summary can be calculated for each of the groups grouped by "region, manager."

In step 320, the system receives a first request to modify data in a data field in the displayed data fields. In some implementations, the request to modify data is a user clicking on a data field. For example, referring to FIG. 2A, the data column "Region" displays three data fields of "As," two data fields of "Bs," and two data fields of "Cs." The user can click on the data field 202 to edit the data in the data field 202.

In step 325, upon receiving the user's editing, the system can commit the edited data into the database. In various implementations, the database reporting tool sends data manipulating statements through a database interface to retrieve data. A database interface can include database drivers that contain specific details with regard to the database. Examples of database interface are database-specific Application Programming Interface ("API") (e.g., TransactSQL), language-specific API (e.g., Java Database Connectivity ("JDBC")), and standard procedural API (e.g., Open Database Connectivity ("ODBC")). The retrieved data can be organized in various data structures as results sets. In some implementations, JDBC is used. In the example code below, a query is executed to update the database.

```
Statement stmt = con.createStatement( );
stmt.executeQuery("UPDATE sales SET region='B'
        WHERE row_id=3");                       (1)
```

In the example code (1), a "row_id" field is used to identify the row in the database that needs to be updated. In various implementations, a key data field (e.g., a data field whose value can be used to uniquely identify a row in a database table) is tracked and associated with the displayed rows in the formatted view (e.g., table view 200), although the key data field itself may not be displayed. Also in example code (1), a "region" data field is updated. The system can identify which data field to update based on a corresponding display field in the display view. For example, a "Region" column in table view 200 corresponds to the "region" data field in the database table. The correspondence between a data field and a display field can be determined by the layout.

In step 330, the system reformats the formatted view (e.g., table view 200). In various implementations, reformatting the formatted view can include moving the edited data field from an original group section to a target group section, and updating the sub-summary display field of the original group section and the target group section (e.g., as in table view 210).

To reformat the formatted view, the system applies a layout to the edited data. When the sub-summary fields are live and interactive (e.g., can change based on user editing), it is possible that the sub-summary field moves during the live interaction (e.g., in views 200 and 210, sub-summary 204 for region "A" moves from a position in the fourth place in the body of the table in view 200 to a position in the third place in view 210). The move can be determined by the layout. In database reporting tools, a formatter program can apply a layout to the data retrieved from the database and place certain data fields in certain places in certain format. For example, the layout can determine that the data are displayed in a size 12 font, in table cells that is 40 pixels high and 100 pixels wide, etc. In addition, a layout can determine the relative positions of various fields, e.g., where a sub-summary field is displayed on a screen.

Moving the edited data field from an original data section to a target data section can include creating a new data section. For example, in editing table view 200, a user can change the data in data field 202 from "A" to "D." Table view 200 does not include a region "D." Therefore, the system can create a separate data section "D" in table view 210 to accommodate the edited data. The system can put the newly created data section in a proper place among the existing data sections by re-sorting the data sections based on the new data value in the edited data field if the original data sections were sorted on the data column of the edited data field. A new sub-summary field can also be created for the new data section.

Moving a data field from an original data section to a target data section can include deleting an entire data section. For example, in editing table view 200, a user can change data in all "Region" data fields in section "A" from "A" to "B." In response to the change, the system removes data section for region "A" after deleting all records from the region "A" section and inserting the records into the region "B" section. In some implementations, the system identifies the original data section in which the data field being edited belongs. After editing, the system adds the edited data field to a target data section (which can be a new data section). The system examines the original data section. If there are no more records (e.g., data fields) in the original data section, the original data section is removed. The sub-summary section for the original data section is also removed.

A conventional database reporting tool can have a main layout for a database reporting application, where the main layout applies to all reports. The conventional database reporting tool maintains a main layout and applies the main layout to reformat the formatted view. In some implementations of interactive sub-summary techniques, in addition to a main layout (which can be shared by many users), the system maintains a cached layout (which can be stored locally). The cached layout is copied from the main layout. The system can reformat the formatted view using the cached layout. More details on the cached layout will be described below with respect to FIG. 3B.

In some implementations, reformat the formatted view includes reformatting a viewable area of the formatted view instead of re-generating the entire formatted view. Unlike a traditional database reporting tool that regenerates a database report in its entirety, the system can reformat only a relevant portion of the report (e.g., the viewable area). The system can determine which area is viewable by calculating a height variance of a current view. For example, if a user is viewing a portion (e.g., 20 rows) in a large (e.g., an 8,000-row) report, the user's changing a value can cause a particular row to be moved from the viewable portion to another area of the report, and/or a regeneration of the sub-summary data fields. The system can determine which rows and which sub-summary data fields to display on screen by shifting the rows already displayed up or down, instead of regenerating an entirely new report. More details on formatting a display area of the formatted report is described below with respect to FIGS. 5A and 5B.

In step 340, the system displays the reformatted view on a display device. A user can perform further editing on the reformatted view.

Example Process for Modifying a Layout

FIG. 3B is a flow chart illustrating an example process for modifying a layout in a display view. To change the display format (e.g., enlarging table cells or changing cell positions), conventional database reporting tools require a user to edit the main layout. After the layout is edited, the data are reformatted based on the edited main layout. Interactive sub-summary techniques permit a user to edit a cached layout of a display view "on-the-fly," without editing the main layout.

In step 352, the system receives a request to position a data field (e.g., a sub-summary display field) in a display view. In various implementations, the request can be in the forms of a mouse click on a display button (e.g., "underline text in all selected data fields"), a drag-and-drop of a data field (e.g., a total summary field) or data column (e.g., the column header "Sales" of table view 200), or a command from a "modify view" dialog box, etc. The request can be re-ordering data in data columns (e.g., change a sorting "from high to low" into "from low to high") or re-ordering the data columns themselves. For example, in table view 200, a user can click on the "Sales" data column which is displayed on the right side of data column "Sales Rep," drag the "Sales" data column to the left side of the data column "Sales Rep," and drops it there. The "Sales" data column now is displayed in the display view on the left of the data column "Sales Rep."

The system can also reposition a label (e.g., a title of a table displayed at the top of the table view), a summary field (e.g., a total sales field at the bottom of the table view), or a sub-summary field by drag-and-drop. If the field being repositioned is a sub-summary field, the system can limit the place where the sub-summary field can be dropped.

In step 354, the system identifies a data field of which a sub-summary display field being repositioned is a sum. In a display view, sub-summary sections can be tied to the data fields that they summarize. For example, in table view 200, a user can drag sub-summary field 204 and drop it to another place in the table view. The sub-summary field 204 is a sum in the "Sales" data column on three data fields (the sales numbers of "Adam," "Betty," and "Carl").

In step 356, regardless of where the user drops the sub-summary field, the system positions the sub-summary display field above or below the identified data field vertically, and at the same position as the identified data field horizontally. In some implementations, the system positions the sub-summary display fields in the same data column as the data fields the sub-summary display fields summarize. Such positioning can avoid user confusion on what data the sub-summary display fields represent. For example, in table views 200 and 210, sub-summary display fields 202, 206, 214, and 216 represent the sums of number of sales. If the table views 200 and 210 each contains an additional data column "amount of sales" and the user is allowed to position the sub-summary display fields in the data column "amount of sales," the user may later be confused because the sub-summary display fields represent the sums of "number of sales" and do not represent the sums of "amount of sales." Therefore, the system can automatically move the sub-summary display fields back to the data column that represents "number of sales."

Within a data column, the sub-summary display field can be positioned above or below the data fields that the sub-summary display field summarizes. A sub-summary display field that is placed above the data fields can be designated as a leading sub-summary display field. A sub-summary display field that is placed below the data fields can be designated as a trailing sub-summary display field. For example, in table view 200, a user can drag and drop the sub-summary display field 204 to a position above record 201 ("A," "Adam," and "100"). The sub-summary display fields for number of sales can then be placed above the number of sales data fields for each sales rep. In various implementations, when a user drops the sub-summary display field into the repeating data fields (e.g., below record 201 but above data field 202), the system can alternatively ignore the drop, reposition the sub-summary display fields, or determine whether to reposition the sub-summary display fields based on distances between the drop position and the leading or trailing positions.

In various implementations, the system can position the sub-summary display fields in manners similar to the techniques described above regardless of which particular instance of sub-summary display field the user attempts to reposition. Repositioning a single sub-summary display field can cause all related sub-summary fields to be repositioned. For example, in table view 200, the system can reposition the sub-summary display fields on "Sales" regardless whether the user requests to move sub-summary display field 204 or sub-summary display field 206.

FIGS. 4A and 4B illustrate exemplary layouts for formatting display views as used in interactive sub-summaries. In various implementations, the system maintains a cached layout to implement the process described above with respect to FIG. 3B. The repositioning of data fields and sub-summary display fields on the display view can be accomplished by modifying the cached layout that is generated from the main layout and is distinct from the main layout. Therefore, a user can adjust the display view without affecting other users using the same main layout.

FIG. 4A illustrates an exemplary main layout 400. A user can go to a layout editor program to add display fields, including leading sub-summary display fields and trailing sub-summary display fields. The example main layout 400 contains various parts. For example, the main layout 400 can contain a leading grand summary part 402, a leading sub-summary part 404, field definition parts 405, 406, and 408, a body part 410, and a trailing sub-summary part 412. The main layout can also contain various boilerplate fields (e.g., text that is not retrieved from a database). The body part 410 is a place where data fields repeat to reflect the multiple records in a database table. Each repetition of body part 410 can be an instance of the body part 410. Similarly, the sub-summary parts 404 and 412 can have multiple instances. A table view can be generated when the main layout is saved.

FIG. 4B illustrates an exemplary table layout 420 for a table view. A table view can include a hidden table layout 420, which caches the various parts in the main layout. In the table layout 420, data fields are arranged in a table format. The field definition parts 405, 406, and 408 can define columns "Region," "Name," and "Sales," arranged in columnar format in the table layout 420. Leading sub-summary part 424, body part 430, and trailing sub-summary part 412 are arranged in a tabular format. Both the main layout and the cached layout can be stored on a storage device in a tree structure, in which various parts of the data display fields are represented by nodes in the tree.

To generate the table layout 420, the system copies parts from the main layout to the table layout. Parts are copied in an order in which the parts appear on the main layout. For example, leading sub-summary part 404 can be copied first, then the body part 410, and then the trailing sub-summary part 412. The system can process the leading sub-summary part 404 and the trailing sub-summary part 412 to confirm that sub-summary data fields are placed in the sub-summary parts. The system can ensure that a sub-summary data field (e.g., "SUM(num_sales)") is placed in one of the sub-summary parts, and that non-summary data fields (e.g., "name") are placed in other parts of the layout.

After determining that the sub-summary parts contain sub-summary data fields and sub-summary data fields are in sub-summary parts, the system can also examine whether the data fields being summarized are in the body part 410. If the data fields being summarized are in the body part 410, the system can acquire the coordinates of the data field. The system can use the coordinates to place the sub-summary display field. For example, if a data field in the body part 410 has (x, y) coordinates, the system can place the sub-summary display field that summarizes the data field at horizontal coordinate x and vertically at the top of the body part 410 so that the sub-summary display field aligns with the data fields in the body part 410. If the sub-summary part is a leading sub-summary part 404, the sub-summary display field can be placed at the bottom of the leading sub-summary part 404. If the sub-summary part is a trailing sub-summary part 412, the sub-summary display field can be placed at the top of the trailing sub-summary part 412.

A user can have more than one level of sub-summary display fields. For example, the user can have a level of sub-summary display fields for regions and a level of sub-summary display fields for states. In such cases, the system can expand the sub-summary parts and stack the sub-summary fields one on top of another in the table view 420.

When a user edits a display view, the hidden table layout 420 is modified. For example, when the user resizes or reorders data columns in the display view, the sizes and positions of the columns in the table layout 420 changes. The coordinates of the sub-summary display fields can move with the data columns that have been moved.

An example table layout 420 is shown in FIG. 4B. The table layout can correspond to a table view. Other forms of layouts, such as a list layout that can correspond to a list view, can be implemented similarly.

Figure 4C:
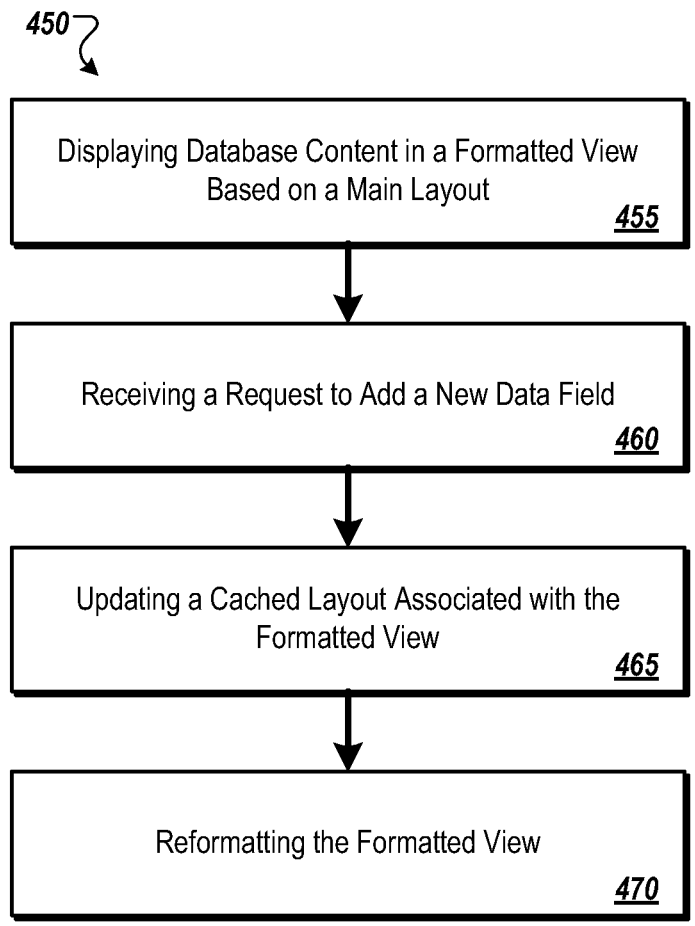
FIG. 4C is a flowchart illustrating an exemplary process for adding a new data display field using interactive sub-summary techniques.

FIG. 4C is a flowchart illustrating an exemplary process 450 for adding a new data display field using interactive sub-summary techniques. A user can create a sub-summary part 404 that contains a sub-summary field in a main layout 400 without including a corresponding data field that the sub-summary field summarizes in the body part 410. For example, the user can have a leading sub-summary part 404 containing a sub-summary data field that summarizes the number of sales. The user can leave out the number of sales column in the field definitions. In some implementations, the system hides the sub-summary display field in the display view if the underlying data of the sub-summary display field are not displayed. Hiding the sub-summary display field can include not copying the sub-summary part 404 from the main view 400 to the table view 420. However, because the display view is interactive, a user can add a data column while viewing the display view formatted using the main layout 400 and table layout 420. If the added data column contains the underlying data of the sub-summary data field, the system can adjust the table layout 420 and display the formerly hidden sub-summary display field.

In step 455, the system displays database content in a formatted view based on a main layout (e.g., 400). The formatted view can be a table view containing a cached layout (e.g., a hidden table layout 420). The cached table layout 420 can be generated from the main layout 400.

In step 460, the system receives a request to add a new data field. The request can be received through a display view modification interface (e.g., a "modify table view" dialog box and an "add fields" dialog box). Adding a new data field can result in a new data column being added to the display view. In some implementations, the system permits the user to add a data field (e.g., "num_sales") that exists in a database table from which the database content is retrieved. If a user attempts to add a new data field that is not in a database table, the system permits the user to add the new data field after automatically or manually editing the cached data by creating a corresponding data field. In addition to adding a data field in the database or the cache, the user can also add a sub-summary field or a grand summary field.

In step 465, the system updates the cached layout 420 associated with the formatted view based on the request. The system can create one or more new layout nodes in the cached layout 420 to represent the new data fields and the new data column. The new layout nodes can contain coordinates of the new data fields. In some implementations, the coordinates of the new layout nodes are determined by coordinates of existing layout nodes. For example, if the user adds a new sub-summary field for data column "Sales" in the display view, the new node in the table layout 420 representing the added sub-summary field can be determined by the coordinates of the data fields representing "num_sales" in the cached table layout.

In some implementations, the system identifies layout nodes that are relevant to the new data field from the main layout 400 and copies the identified layout nodes from the main layout 400 to the cached layout 420. Copying the nodes can happen when, in addition to the user added data fields, the system needs to display otherwise undisplayed data fields from the main layout 400 based on the addition. For example, a main layout 400 can include a sub-summary part that displays sub-summaries on "number of sales." In some implementations, the sub-summaries on number of sales are not copied to the cached table layout originally, because the sub-summaries on an undisplayed field are not displayed (e.g., when a user removes the "number of sales" column from a display view, causing a regeneration of the cached layout 420). However, after the user adds the data field that displays number of sales back into the display view, the sub-summaries on number of sales can be displayed. Therefore, after the user adds the display field, the system reads the main layout and determines which data fields can be displayed as a result of adding the display field, and copies the corresponding layout nodes to the cached table layout 420.

In step 470, the system reformats the formatted view according to the updated table layout 420. The process 450 can be repeated, allowing a user to add multiple data fields in the display view in multiple rounds of editing. Similarly, processes can be implemented to allow user to delete data fields from the display view. When a user deletes a particular data column (e.g., "Sales"), the data fields and the sub-summary fields in the data column can be removed together. The nodes representing the data field and the sub-summary field are removed from the cached table layout 420.

In some implementations, the main layout is not modified by a user adding, editing, and deleting data fields in the displayed view. Only cached layouts are modified. Therefore, multiple users can each have a display view customized to the user's need. Each display view can have a cached layout. The editing of the display view can be contained in the cached layout.

Formatting Viewable Layout

Figure 5A:
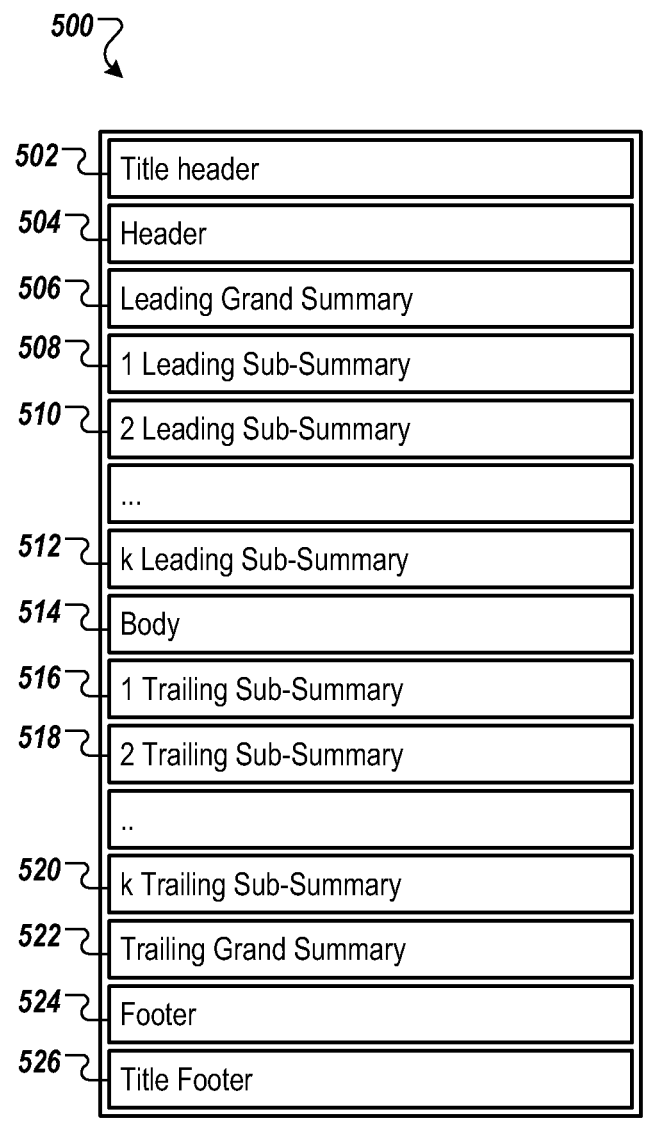
FIGS. 5A and 5B illustrate an exemplary implementation of a scrollable layout that contains scrollable interactive sub-summary parts.
Figure 5B:
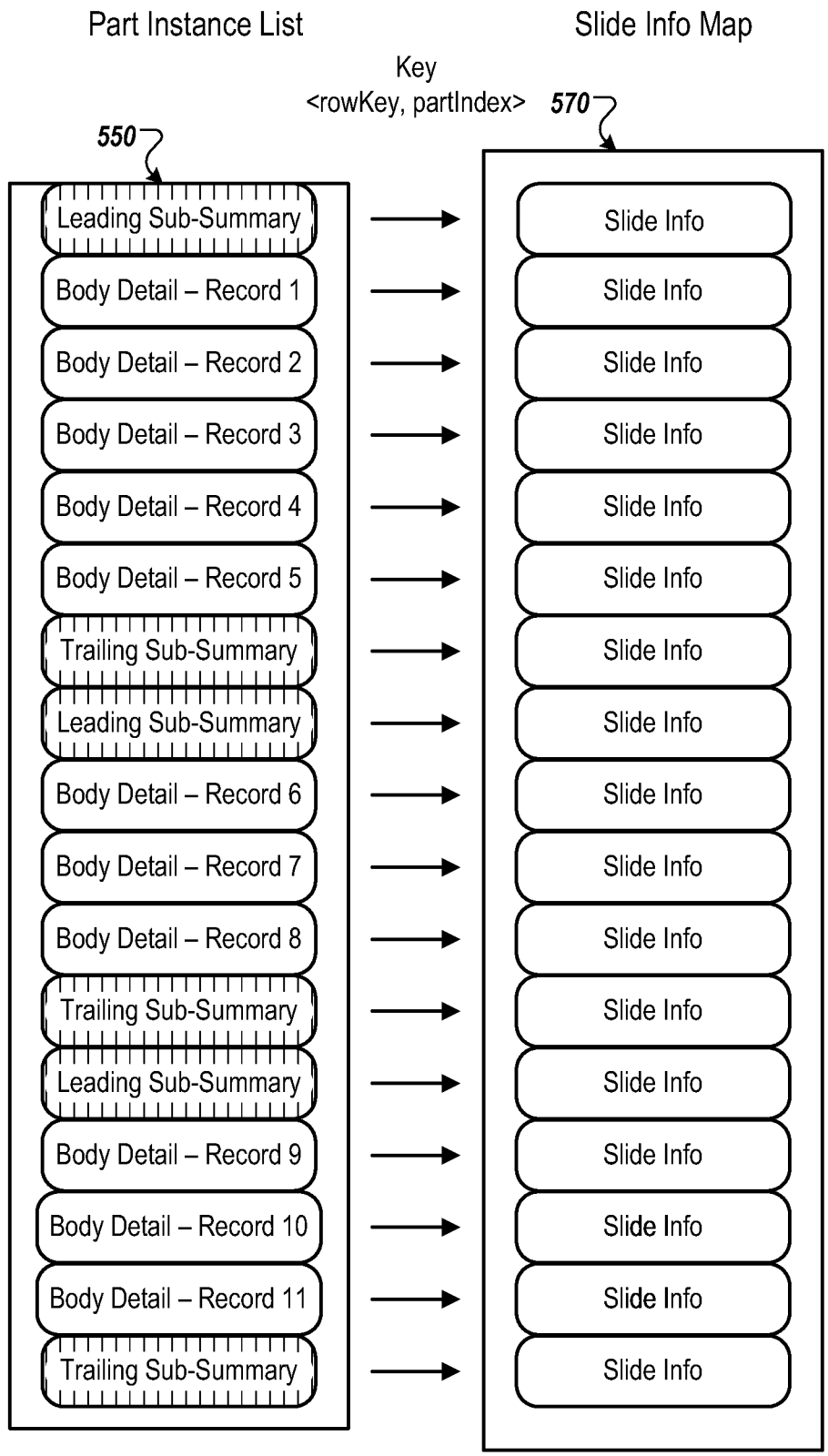

FIGS. 5A and 5B illustrate an exemplary implementation of a scrollable layout that contains scrollable interactive sub-summary parts. In various implementations of interactive sum-summaries, a portion of a formatted view (instead of the entire database report) is re-formatted after a user modification. FIG. 5A illustrates an exemplary layout 500 that contains interactive sub-summary parts. A display view can include many rows that cannot be displayed on a single display screen all at once. In various implementations, a user can view a viewable portion of the display view, limited by the user's display screen. When a user scrolls on the screen to view various viewable portions of the display view, and when a user edits a value of a particular data field, the system can calculate which portion (e.g., which rows of data, which sub-summary fields) to be displayed on screen. Determining the portion to display can include calculating the total height of the display view and determining where the user is scrolling (e.g., where the scrollbar "grip" is), and which rows need to be displayed based on the user edit.

To calculate which rows need to be displayed, the system can calculate a new origin based on a window, a display view, and a scroll offset. The origin can be a top cursor, which is the first visible row cursor at the top of the view. Based on the top cursor, the system can determine what rows and associated sub-summaries parts are to be displayed. The system can make the determination by building a part instance list. Building a part instance list will be explained in more details below with respect to FIG. 5B.

In some implementations, a table view is a kind of a list view. The table view can be implemented using a special hidden layout that can be rendered in list view. The hidden table can be generated automatically when the layout is saved.

In a conventional, non-interactive display view, the total height of the display view is fixed because the total number of rows returned from the database (which determines the total height of the display view) is fixed when the data are retrieved from the database. After the data are retrieved, the system knows how many rows of records are to be displayed. In a display view where interactive sub-summary techniques are applied, the total height of the display view is dynamic because user modification in the data fields can cause new sub-summary fields to be created or deleted (e.g., when a user changes data in field 202 from region "A" to region "D," a new data section and a new sub-summary field for the new region "D" is created). The number of records displayed is dependent on the content in the data (e.g., how many distinct regions there are) and user editing. Therefore, techniques for dynamically calculating the height of the display view need to be employed.

As an example, the layout 500 in FIG. 5A can be a table layout or a list layout. The layout 500 contains multiple parts, including a title header part 502, a header part 504, a leading grand summary part 506 (e.g., a total number of sales of all regions), a leading high-level sub-summary part 508 (e.g., number of sales of each country), a leading mid-level sub-summary part 510 (e.g., number of sales of each state), and a leading low-level sub-summary part 512 (e.g., number of sales of each region). There can be other levels of leading sub-summary parts.

The layout 500 can also include a body part 514 which contains repeating data fields (e.g., rows corresponding to the rows in the database tables), multiple levels of trailing sub-summary parts 516, 518, and 520, trailing grand summary part 522, footer 524, and title footer 526. Each part can contain one or more objects (e.g., boilerplate text, images, or data fields). The parts and the objects can be stored as nodes in a tree structure. The geographical information of the objects (e.g., size, position) can be stored in the nodes.

In various implementations, the system imposes various rules on the placement of objects in the parts. For example, a placement rule can specify that objects in a leading part (e.g., a leading grand summary part or a leading sub-summary part) are placed at the bottom of the part, and objects in a trailing part are placed at the top of the trailing part. This placement rule can make the objects appear close to the body part, which contains data that the object summarizes, in the final display view. A sizing rule can specify that the size of each of the leading and trailing sub-summary parts, measured by rows that represent a number of objects in the part, be one more than the number of objects in the part. An alignment rule can specify that the text in a sub-summary field be aligned using the same text alignment rule as in the field whose data the sub-summary field summarizes.

Each part in the layout 500 can have multiple instances. For example, the body part 514 can have one instance for each data record (e.g., row of data) returned from the database. The leading sub-summary part 512, which sub-summarizes data for each region, can have one instance for each region. The instances of the parts that are viewable on a screen can be stored in a part instance list 550, as described below with respect to FIG. 5B.

FIG. 5B illustrates an exemplary scrollable layout that contains scrollable interactive sub-summary parts. The scrollable layout in FIG. 5B allows the system to update a visible portion of a display view when a user modifies data, without reformatting the entire database report. A part instance list 550 is a list of scrollable layout parts that are in view. In part instance list 550, each part instance can contain a part detail record, which can describe layout information of the part instance. Each part detail record can be represented individually. Each part detail record can be linked to a slide manager ("Slide Info") through a pair key. The slide manager can determine the size and position the part instance on a display device when the part instance is displayed. The key can include a part index, which specifies to which part (e.g., leading sub-summary, body, etc.) the instance belongs, and a row key which specifies which row in the part the body instance or a sub-summary instance is in.

The system can build the part instance list 550 in various manners. In some implementations when the displayed data are not sorted, the system can iterate through the data records in the displayed data starting from the top cursor. For each record iterated, the system can create a new instance of a part instance description object, initialize the object with information of the body part 514, and insert the part instance description object into the part instance list. The iterations continue until the total vertical space of all the added parts is greater than a predefined limit (e.g., the height of a viewing rectangle plus a max record height).

In some other implementations, the displayed data are sorted into one or more levels. Data records and information on the data records can be grouped into bins (e.g., groups of country "US," country "Canada," and sub-groups of region "A," region "B," etc.) The system can iterate through each level, starting from the top cursor and lowest level of sorting (e.g., region), and determine whether to add sub-summary parts (leading and trailing) to the part instance list 550. The system can make the determination by examining whether the sorting level matches a sub-summary defined in the layout 500. For example, if a currently traversed sorting level is "region" and a sub-summary field for "region" is defined in the layout 500, a sub-summary part is inserted into the part instance list 550. When the system reaches an end of a current traversal level, the system moves to a next higher traversal level and repeats the process. The iterations continue until the total vertical space of all the added parts is greater than a predefined limit (e.g., the height of a viewing rectangle plus a max record height).

In some implementations, when a user scrolls through the display view or edits data in the display view, the system can redraw the screen by calling a draw list view function. During a redrawing of the screen, the draw list view function can activate a part instance manager software component. The system can check the part instance manager to determine if the part instance list 550 needs to be updated. If the part instance list 550 needs to be updated, the system rebuilds the part instance list 550. During the rebuild, the system can activate a slide manager software component for each part instance. A slide manager can contain information on the height of a part instance. Each part instance can have a distinct height. Therefore, each part instance can be associated with a distinct slide manager. The system can compute bounds for the object in the part instance using the slide manager associated with the part instance. If there is no slide manager associated with the part instance, the system can create a slide manager by instantiating a slide manager class object.

In some implementations, the slide managers are cached in a Slide Info Map 570, separately from the part instances. To improve efficiency, the system can cache the slide manager software component instead of instantiating and destroying it each time the part instance list 550 is rebuilt. The system can store instances of the slide manager separately in the map 570 and associate each part instance in the part instance list 550 with an entry in the map 570 using the pair key. On a data change notification, the system can access the map 570 and mark the corresponding slide manager as outdated. The actual updating of the outdated slide manager can occur during a draw cycle.

To determine where the user is scrolling, the system can determine a relative position of a "grip" on a scrollbar. The grip, alternatively known as a thumb, a wiper, or a slide, is a display bar that a user can drag and move along a track in order to move to various parts of a display view. In some implementations, the length of the track in a vertical scrollbar on the display view corresponds to a scrollbar height. The scrollbar height can be determined by multiplying a number of records (e.g., number of rows returned from a database query) by a maximum record size. The maximum record size can be a sum of leading and trailing sub-summary parts defined for a given layout. When the user scrolls vertically in a table view or a list view, the system can calculate a scrollbar delta (e.g., how many records the user scrolled over according to the distance the grip has moved and the height of the scrollbar). The system can use the scrollbar delta to determine which record or records the viewable portion needs to display, and update the part instance list 550 accordingly.

Example System Architecture

Figure 6:
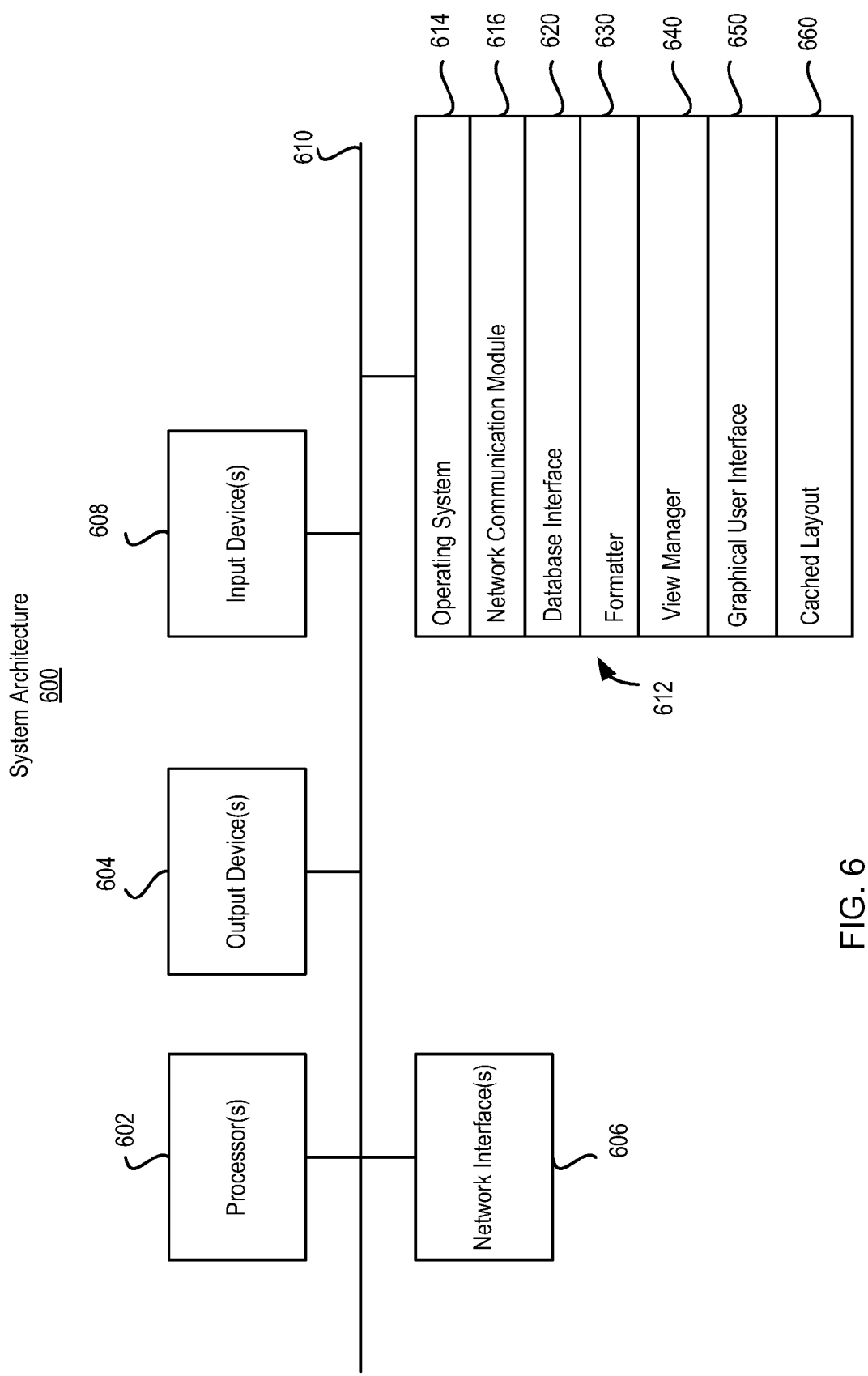
FIG. 6 illustrates an example computer system that performs an enhanced compilation as described in reference to FIGS. 1-5.

FIG. 6 is a block diagram of a system architecture 600 for implementing the features and operations described in reference to FIGS. 1-5. Other architectures are possible, including architectures with more or fewer components. In some implementations, the architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics.

The computer-readable medium 612 further includes an operating system 614 (e.g., Mac OS® server, Windows® NT server), a network communication module 616, a database interface 620, a formatter 630, a view manager 640, a graphical user interface 650, and a cached layout 660, as described in reference to FIGS. 1-5. The operating system 614 can be multi-user, multiprocessing, multitasking, multithreading, real time, etc. The operating system 614 performs basic tasks, including but not limited to: recognizing input from and providing output to the devices 606, 608; keeping track and managing files and directories on computer-readable mediums 612 (e.g., memory or a storage device); controlling peripheral devices; and managing traffic on the one or more communication channels 610. The network communications module 616 includes various components for establishing and maintaining network connections (e.g., software for implementing communication protocols, such as TCP/IP, HTTP, etc.). The view manager 640 can include one or more part instance managers, one or more slide managers, one or more part instance lists 550, and one or more slide info maps 570.

The architecture 600 is one example of a suitable architecture for hosting a browser application having audio controls. Other architectures are possible, which include more or fewer components. The architecture 600 can be included in any device capable of hosting a database application program. The architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

For example, updating data in a database is described using SQL as an example. It is understood that various databases, including relational databases, object-oriented database, and other databases can be utilized as a backend database engine to implement the interactive sub-summary techniques.

What is claimed is:

1. A computer-implemented method, comprising:
   providing for display a portion of a formatted view of data, the formatted view comprising one or more data rows;
   receiving a request to modify a data value in a data row of the one or more data rows, the request causing a new data row to be added for display or a displayed data row to be deleted;
   determining, a new portion of the formatted view for display, wherein determining the new portion comprises:
     iterating through the data rows from an initial position of the displayed portion of the formatted view;
     in each iteration, adding a height of a data row to a sum of data row heights, until the sum of data row heights satisfies a threshold; and
     designating data rows the heights of which caused the sum to satisfy the threshold as the new portion of the formatted view for display;
   reformatting the new portion of the formatted view, wherein the data rows in the new portion of the formatted view are fewer than data rows in the entire formatted view; and
   providing the new portion of the formatted view for display.

2. The method of claim 1, wherein each of the new data row to be added for display or the displayed row to be deleted is a sub-summary row corresponding to a section of data rows, wherein the request causes a new data section to be created or a data section to be deleted.

3. The method of claim 1, wherein iterating through the data rows comprises iterating through multiple sort levels of the data rows, starting from a lowest level.

4. The method of claim 1, wherein reformatting the formatted view comprises formatting only the new portion of the formatted view without formatting other portions of the formatted view.

5. The method of claim 1, wherein the threshold is a height of a viewing rectangle plus a maximum data row height and the initial position is a top position of displayed data rows.

6. The method of claim 1, wherein each data row corresponds to a distinct slide information item comprising a height of the corresponding data row, the slide information items being cached separately from the data rows and being mapped to the data rows using one or more pair keys.

7. A computer program product encoded on a non-transitory computer storage medium, operable to cause data processing apparatus to perform operations comprising:
   providing for display a portion of a formatted view of data, the formatted view comprising one or more data rows;
   receiving a request to modify a data value in a data row of the one or more data rows, the request causing a new data row to be added for display or a displayed data row to be deleted;
   determining a new portion of the formatted view for display, wherein determining the new portion comprises:
     iterating through the data rows from an initial position of the displayed portion of the formatted view;
     in each iteration, adding a height of a data row to a sum of data row heights, until the sum of data row heights satisfies a threshold; and
     designating data rows the heights of which caused the sum to satisfy the threshold as the new portion of the formatted view for display;
   reformatting the new portion of the formatted view, wherein the data rows in the new portion of the formatted view are fewer than data rows in the entire formatted view; and
   providing the new portion of the formatted view for display.

8. The program product of claim 7, wherein where each of the new data row to be added for display or the displayed row to be deleted is a sub-summary row corresponding to a section of data rows, wherein the request causes a new data section to be created or a data section to be deleted.

9. The program product of claim 7, wherein iterating through the data rows comprises iterating through multiple sort levels of the data rows, starting from a lowest level.

10. The program product of claim 7, wherein reformatting the formatted view comprises formatting only the new portion of the formatted view without formatting other portions of the formatted view.

11. The program product of claim 7, wherein the threshold is a height of a viewing rectangle plus a maximum data row height and the initial position is a top position of displayed data rows.

12. The program product of claim 7, wherein each data row corresponds to a distinct slide information item comprising a height of the corresponding data row, the slide information items being cached separately from the data rows and being mapped to the data rows using one or more pair keys.

13. A system comprising:
one or more computers operable to perform operations comprising:
providing for display a portion of a formatted view of data, the formatted view comprising one or more data rows;
receiving a request to modify a data value in a data row of the one or more data rows, the request causing a new data row to be added for display or a displayed data row to be deleted;
determining a new portion of the formatted view for display, wherein determining the new portion comprises:
iterating through the data rows from an initial position of the displayed portion of the formatted view;
in each iteration, adding a height of a data row to a sum of data row heights, until the sum of data row heights satisfies a threshold; and
designating data rows the heights of which caused the sum to satisfy the threshold as the new portion of the formatted view for display;
reformatting the new portion of the formatted view, wherein the data rows in the new portion of the formatted view are fewer than data rows in the entire formatted view; and
providing the new portion of the formatted view for display.

14. The system of claim 13, wherein each of the new data row to be added for display or the displayed row to be deleted is a sub-summary row corresponding to a section of data rows, wherein the request causes a new data section to be created or a data section to be deleted.

15. The system of claim 13, wherein reformatting the formatted view comprises formatting only the new portion of the formatted view without formatting other portions of the formatted view.

16. The system of claim 13, wherein iterating through the data rows comprises iterating through multiple sort levels of the data rows, starting from a lowest level.

17. The system of claim 13, wherein the threshold is a height of a viewing rectangle plus a maximum data row height and the initial position is a top position of displayed data rows.

18. The system of claim 13, wherein each data row corresponds to a distinct slide information item comprising a height of the corresponding data row, the slide information items being cached separately from the data rows and being mapped to the data rows using one or more pair keys.

* * * * *